United States Patent

Yamada

[11] Patent Number: 5,583,955
[45] Date of Patent: Dec. 10, 1996

[54] IMAGE PROCESSING APPARATUS

[75] Inventor: Masanori Yamada, Kawasaki, Japan

[73] Assignee: Canon Kabushiki Kaisha, Tokyo, Japan

[21] Appl. No.: 174,683

[22] Filed: Dec. 28, 1993

Related U.S. Application Data

[63] Continuation of Ser. No. 883,932, May 12, 1992, abandoned, which is a continuation of Ser. No. 560,748, Jul. 31, 1990, abandoned.

[30] Foreign Application Priority Data

Aug. 2, 1989 [JP] Japan ................................. 1-200477

[51] Int. Cl.$^6$ .................................................. G06K 9/20
[52] U.S. Cl. .......................... 382/282; 382/201; 358/452
[58] Field of Search .............................. 382/9, 61, 22, 382/48, 58, 199, 201, 202, 203, 282, 283; 358/452, 453, 538

[56] References Cited

U.S. PATENT DOCUMENTS

| | | | |
|---|---|---|---|
| 4,375,654 | 3/1983 | Evans et al. | 382/21 |
| 4,538,182 | 8/1985 | Saito | 358/280 |
| 4,556,915 | 12/1985 | Shibata | 358/280 |
| 4,684,999 | 8/1987 | Sakakibara et al. | 358/452 |
| 4,733,304 | 3/1988 | Homma et al. | 358/452 |
| 4,745,491 | 5/1988 | Kishi et al. | 358/300 |
| 4,771,336 | 9/1988 | Ohtorii | 358/452 |
| 4,771,474 | 9/1988 | Takashima et al. | 382/24 |
| 4,773,098 | 9/1988 | Scott | 382/22 |
| 4,835,618 | 5/1989 | Shimizu | 358/287 |
| 4,847,911 | 7/1989 | Morimoto et al. | 382/22 |
| 4,856,528 | 8/1989 | Yang et al. | 382/22 |
| 4,899,227 | 2/1990 | Yamada | 358/452 |
| 4,941,188 | 7/1990 | Yamada | 382/50 |
| 4,965,678 | 10/1990 | Yamada | 358/452 |
| 4,965,744 | 10/1990 | Wagatsuma et al. | 358/452 |
| 5,048,099 | 9/1991 | Lee | 382/61 |
| 5,058,189 | 10/1991 | Kanno | 382/48 |

FOREIGN PATENT DOCUMENTS

| | | | |
|---|---|---|---|
| 60-260973 | 12/1985 | Japan | G03G 15/04 |
| 60-260972 | 12/1985 | Japan | G03G 15/04 |

*Primary Examiner*—Yon J. Couso
*Attorney, Agent, or Firm*—Fitzpatrick, Cella, Harper & Scinto

[57] ABSTRACT

There is disclosed an image processing apparatus which can edit every area of an original image. Such an apparatus has a designating device to designate a desired area in an original, a memory for dividing the outline of the designated image area into a plurality of line segments and storing data defining the plurality of line segments, a forming circuit to form area data defining the image area based on the data defining the plurality of line segments read out of memory, and a processor to execute the processing of every area of the original image on the basis of the area data formed by the forming circuit. The memory stores the data defining a start point, an end point, and a slope of each of the line segments. With the apparatus, not only a rectangle area but also a plurality of complicated non-rectangle areas can be easily edited and processed by a simple program using a memory of a small capacity.

17 Claims, 15 Drawing Sheets

<AREA COORDINATE TABLE>

| MAIN SCAN COORDINATE | SUBSCAN COORDINATE |
|---|---|
| $x_0$ | $y_0$ |
| $x_1$ | $y_1$ |
| $x_2$ | $y_2$ |
| ⋮ | ⋮ |
| $x_i$ | $y_i$ |
| ⋮ | ⋮ |
| $x_N$ | $y_N$ |

INPUT ORDER

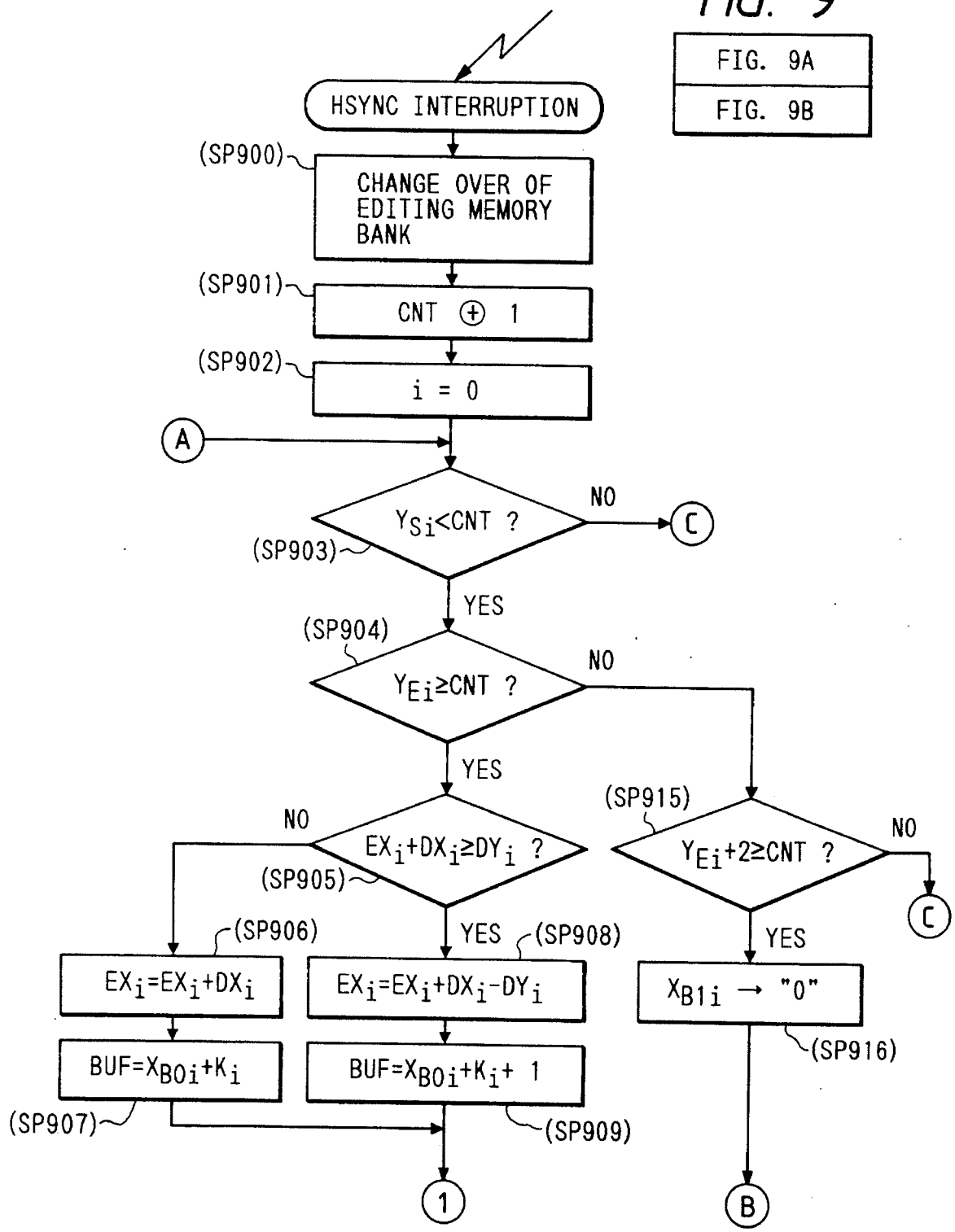

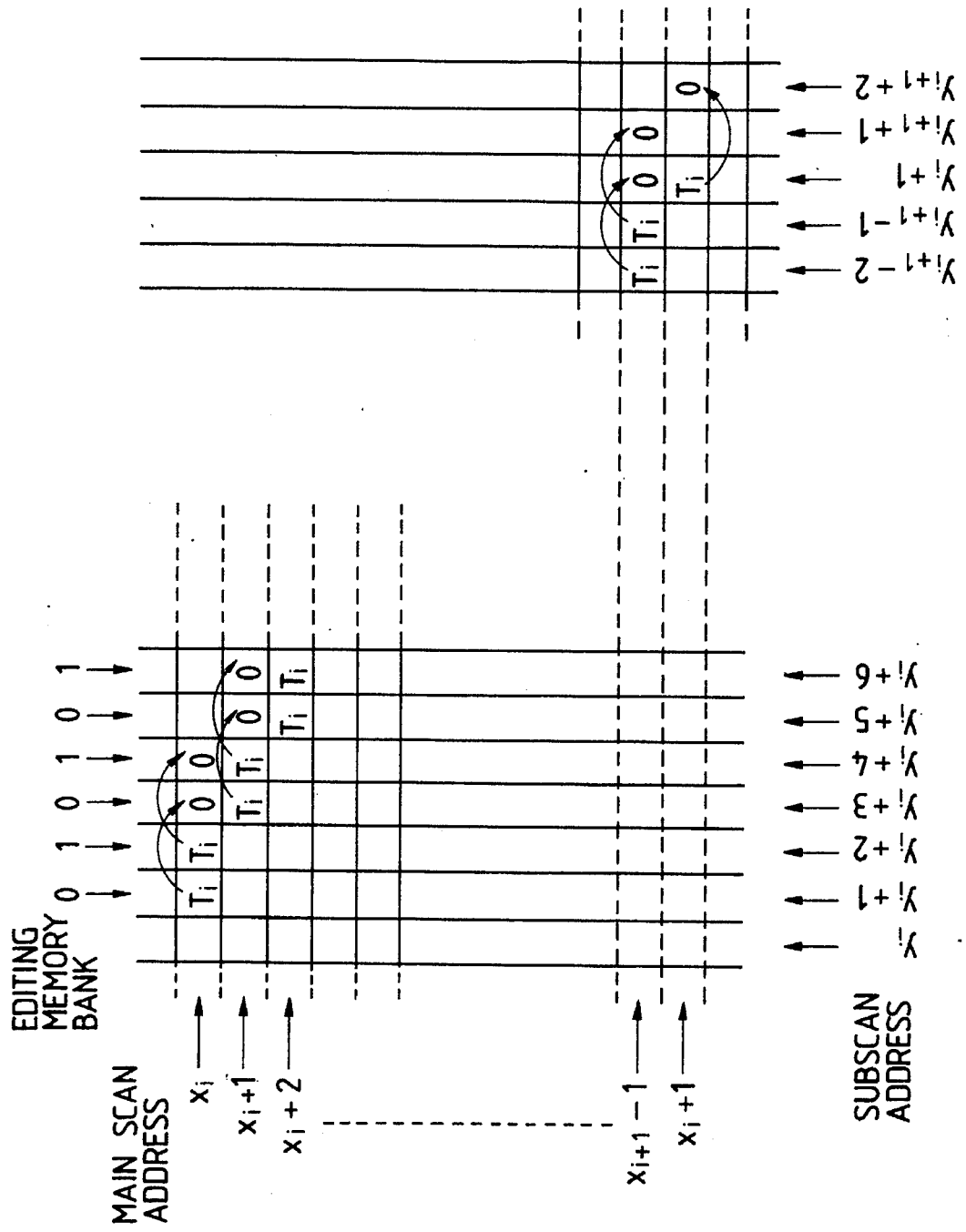

$L_1$ DIFFERENCE TABLE

| −1 | −2 | +2 | +6 | +7 | +3 | −1 | −1 | 0 | +3 | +4 | +1 | ±0 | +1 | +3 | +5 | +6 |

FIG. 15

< LINE SEGMENT $L_i$ TABLE >

| LINE SEGMENT START SUBSCAN COORDINATE $Y_{Si}$ ||
|---|---|
| LINE SEGMENT END SUBSCAN COORDINATE $Y_{Ei}$ ||
| LINE SEGMENT START MAIN SCAN COORDINATE $X_{Si}$ ||
| LINE SEGMENT TYPE $P_i$ ||
| LINE SEGMENT SLOPE $K_i$ | DIFFERENCE TABLE ADDRESS $A_i$ |
| LINE SEGMENT SLOPE $DY_i$ | ADDRESS RENEWAL BUFFER $B_i$ |
| LINE SEGMENT SLOPE $DX_i$ | ——— |
| ARITHMETIC OPERATION BUFFER $EX_i$ | ——— |
| PROCESSING COORDINATE BUFFER $X_{B0i}$ ||
| PROCESSING COORDINATE BUFFER $X_{B1i}$ ||
| PROCESSING CONTENT $T_i$ ||

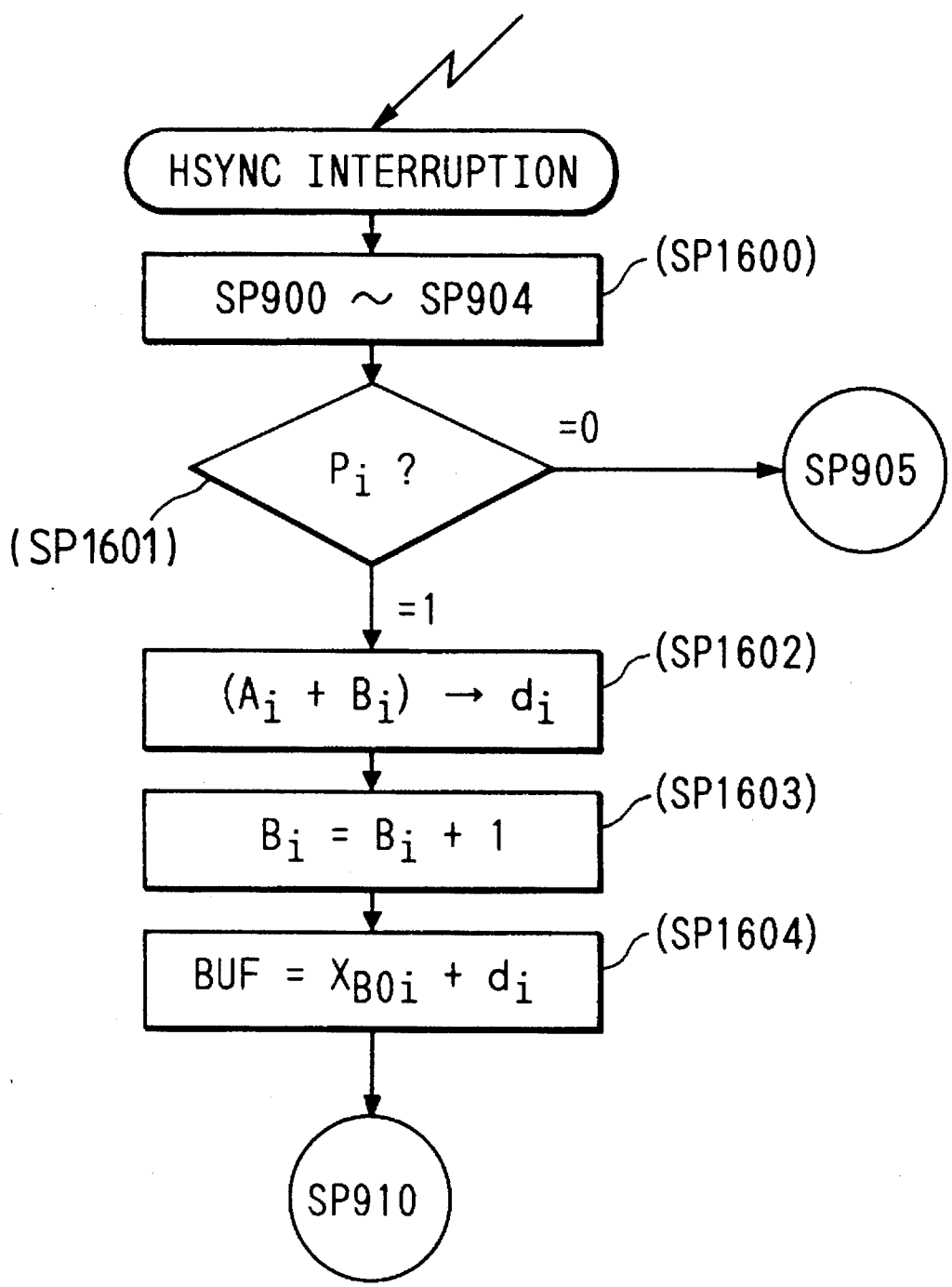

IMAGE PROCESSING APPARATUS

This application is a continuation of application Ser. No. 07/883,932 filed May 12, 1992 now abandoned, which is a continuation of parent application Ser. No. 07/560,748 filed Jul. 31, 1990, now abandoned.

BACKGROUND OF THE INVENTION

1. Field of the Invention

The present invention relates to an image processing apparatus which can edit an image every area.

2. Related Background Art

Hitherto, there has been realized in products which comprise an image processing apparatus such as a copying apparatus or the like, containing area editing functions such as a trimming function in order to output only a partial area of an original image, or a masking function to erase only a partial area, and the like.

The applicant of the present invention has already proposed inventions related to the image processing apparatus having the area editing functions in U.S. Pat. No. 2,556,915 issued on Dec. 3, 1985, U.S. Pat. No. 2,835,618 issued on May 30, 1989, and the like.

However, almost all of the shapes of the areas which can be edited and seen by the conventional copying apparatuses relate to a rectangular shape or a combination of the rectangle. As a method of designating such an editing area, two points on a diagonal line of the rectangle or end points of each line segment around the editing area are designated by a ten-key, a digitizer, or the like. In this case, there is no need to provide a two-dimensional bit map memory of a large enough capacity to store the shape of area in order to edit it. It is sufficient to store only the junction coordinates of the horizontal and vertical line segments which form the editing area. However, the shapes other than the rectangle or other than the combination of the rectangles cannot be processed.

On the other hand, as proposed in U.S. Pat. No. 4,538,182 issued on Aug. 27, 1985, by the applicant of the present invention, there has been realized a product comprising an apparatus in which in order to execute the area editing of an arbitrary shape as well as the rectangle, a desired area on an original is encircled by using a marker pen of a predetermined color or the like and the original image is read and processed in a real-time manner. However, in this case, there is a drawback such that the original is made dirty.

Further, as proposed in U.S. patent application Ser. No. 520,288 filed on May 4, 1990, by the applicant of the present invention, there is also known a method whereby an area of a free shape which was designated by a digitizer or the like is stored into a two-dimensional bit map memory. The area information is then read out of the bit map memory simultaneously with the reading of an original. However, the above method has a drawback such that the resulting costs are obviously high.

SUMMARY OF THE INVENTION

The invention is made in consideration of the above points. It is an object of the invention to provide a method of editing a non-rectangle area in which an original is not made dirty and an editing memory of a large capacity is unnecessary.

Another object of the invention is to execute an efficient image processing of every area in accordance with the designation, not only of a rectangle area but also a non-rectangle area.

Still another object of the invention is to provide an efficient image processor to enable not only data indicative of a rectangle area but also data indicative of a non-rectangle area to be stored in a memory of a small capacity.

Still another object of the invention is to enable area data indicative of an area comprising a complicated shape to be read out of memory in parallel with the image processing using the area data.

The above and other objects and features of the present invention will become apparent from the following detailed description and the appended claims with reference to the accompanying drawings.

BRIEF DESCRIPTION OF THE DRAWINGS

FIG. 10 is a diagrammatical view of the editing processing;

FIG. 15 is an explanatory diagram of a data table; and

FIG. 16 is a flowchart for the editing processing.

DETAILED DESCRIPTION OF THE PREFERRED EMBODIMENTS

Figure 1:
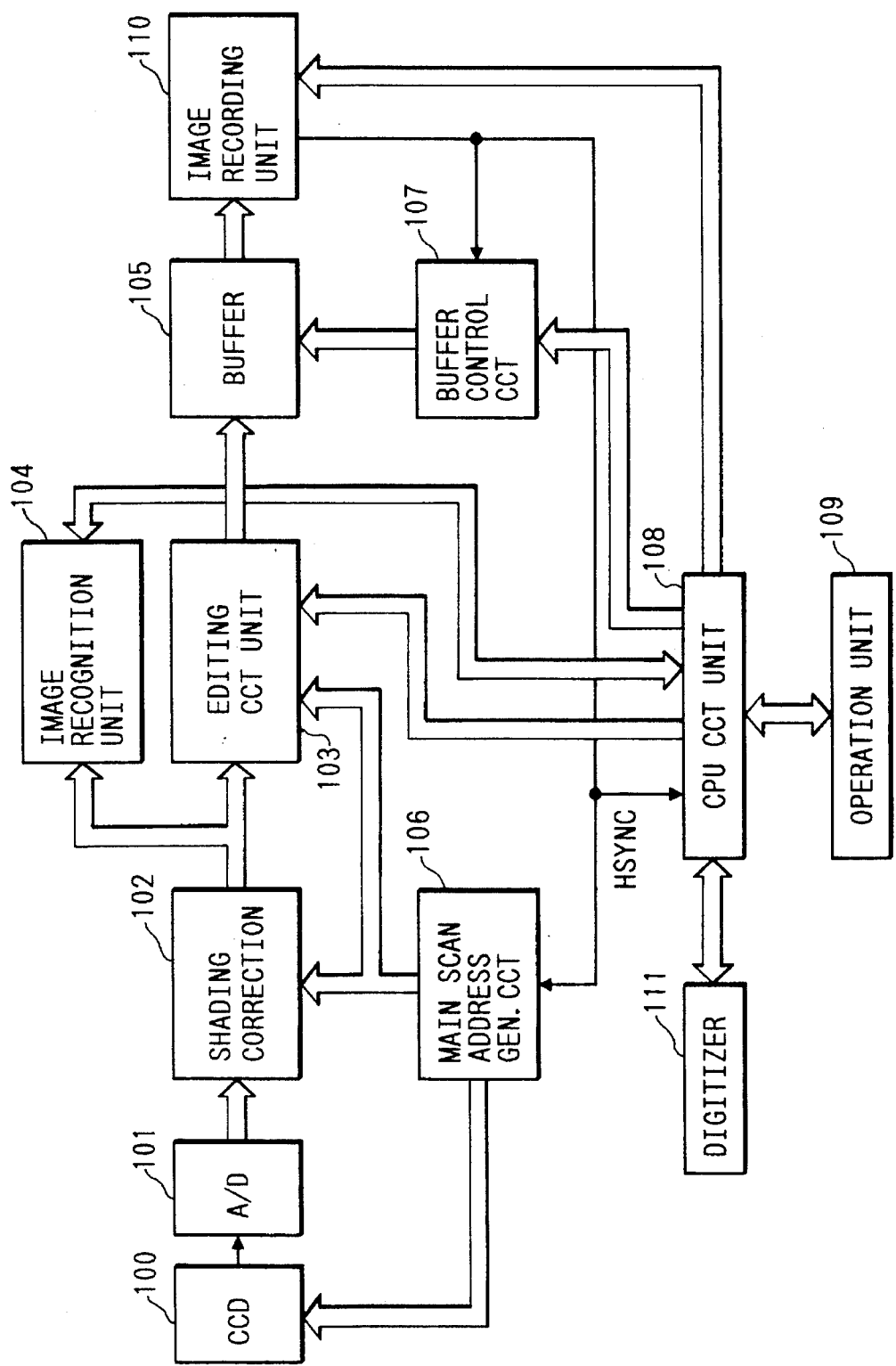
FIG. 1 is a block diagram of a whole apparatus.

FIG. 1 is a block diagram showing a whole circuit construction of an apparatus according to the invention. A CCD 100 receives the reflected light from an original and outputs an analog signal. The analog signal is converted into the digital signal of eight bits by an A/D converter 101. After that, the unevenness of the signal level is corrected by a shading correction circuit 102. The image data which was shading corrected is sent to an image recognition unit 104 and an editing circuit unit 103. In the image recognition unit 104, the position and size of the original image are recognized. The editing circuit unit 103 executes editing processes such as trimming, masking, and the like. After that, the image data is sent to a buffer 105 and is subjected to processes such as enlargement, reduction, and movement in the main scan direction on the basis of the control of a buffer control circuit 107. Then, the processed image data is sent to an image recording unit 110 and reproduced as a copy image on a recording medium such as a paper or the like.

A main scan address generating circuit 106 generates clocks to drive the CCD 100 and addresses to execute the shading correction and editing processing.

A CPU circuit unit 108 has: a CPU to control the whole apparatus; an ROM; an RAM; a timer circuit; an I/O unit; and the like. The CPU circuit unit 108 controls the above circuit units and is connected to an operation unit 109 and a digitizer 111 to designate an area.

The editing circuit unit (103 in FIG. 1) will now be described in detail with reference to FIGS. 2 and 3.

Editing memories 401 and 402 are RAMs to store the image editing data (that is, information to execute the image processing). When MSEL (memory selection signal) is set to the high "H" level, selectors 403 and 405 select the A side and the editing memory 401 is controlled by a CCD address (main scan address). At this time, selectors 402 and 406 select the B side and the editing memory 402 is controlled by the micro computer addressing. In this state, the editing memory 402 is connected to an address bus and a data bus of a micro computer. The micro computer can freely read and write.

When the editing memory 401 or 402 is connected to the CCD address, the addresses in the editing memory 401 or 402 correspond to the pixel addresses of the CCD 100. That is, the first pixel of the CCD 100 corresponds to memory address 1. The nth pixel corresponds to address n. In the embodiment using the CCD having 5000 pixels, the RAM of 8 kbytes (8 kbits×8) is used as an editing memory. Therefore, the processing data to process the mth pixel is written into address m in each of the editing memories 401 and 402.

On the other hand, each of the editing memories 401 and 402 has a 7-bit construction. In the embodiment, the image editing data indicative of "permission of output of the image" is stored into bit 0; similarly, "the output inhibition area of the image is set to black" is stored into bit 1; "negative" is stored into bit 2; "black output" is stored into bit 3; "gamma correction level" is stored into bits 4 and 5; and "photograph area" is stored into bit 6, respectively.

Further, because two kinds of editing memories 401 and 402 are provided, the apparatus is capable of setting the MSEL (memory selection signal) to the high "H" or low "L" level every one or a few lines, thereby alternately switching to the RAM with the micro computer access and the RAM with the CCD address access. That is, when the micro computer access is set and the next information is being written into one of the memories, the other memory, in which the information has already been written, is set into the CCD address access and is used to edit the CCD image.

To switch the existing image editing data which is output to a bus 409 with new data, it is sufficient to switch the MSEL and to change over from the memory with the CCD address access to the memory which was rewritten by the micro computer. That is, the editing data can be changed as frequently as every line. On the other hand, in the case where the image editing data is not changed, that is, when the MSEL is not changed, the same image editing data is always output to the bus 409 and used.

The image editing data will now be described.

Figure 3:
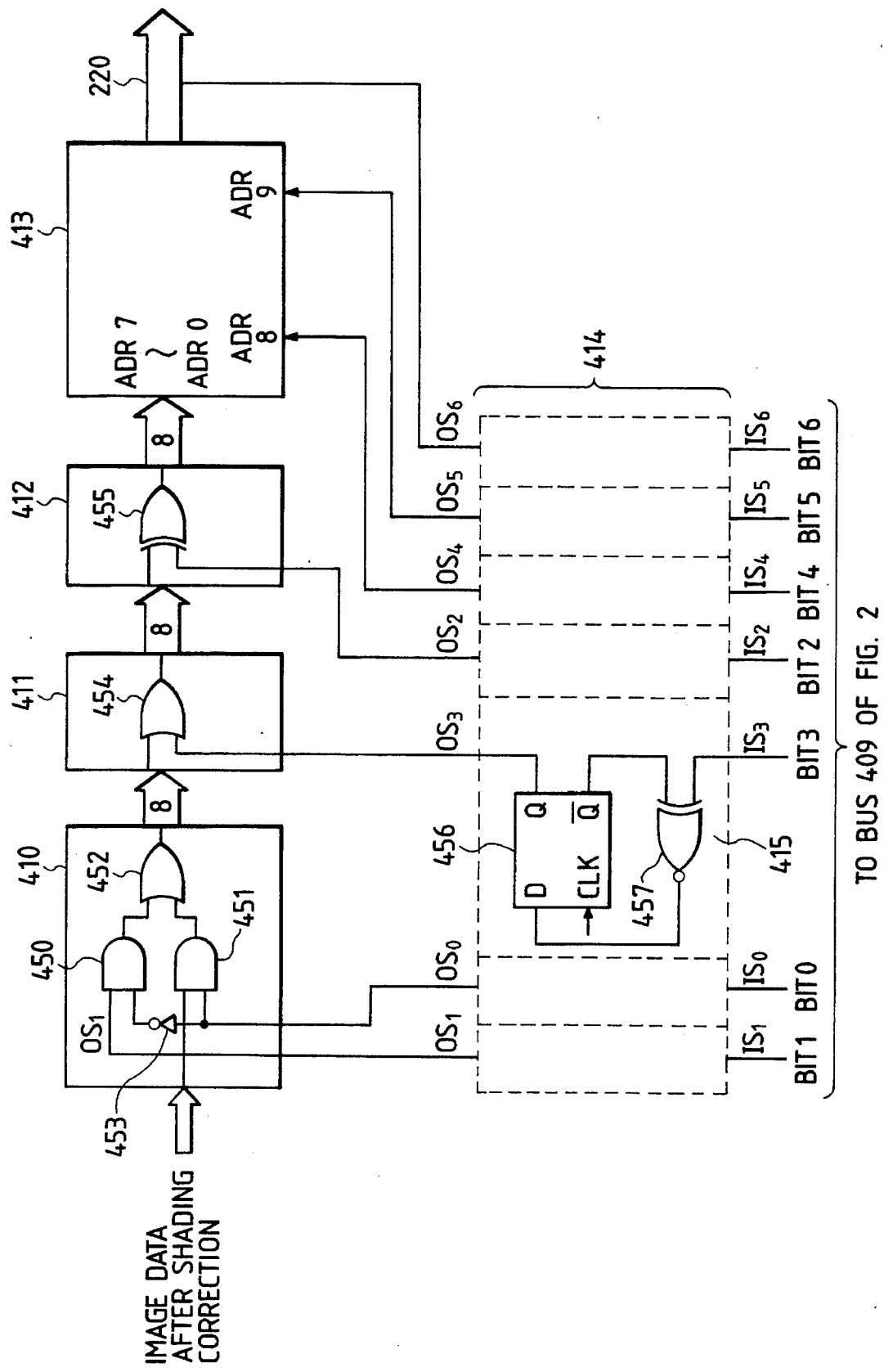

The shading corrected image data is sent to a trimming block 410 shown in FIG. 3. In the image data in the embodiment, "FF" denotes black, "OO" indicates white, and as the number increases, the color approaches black.

Figure 2:
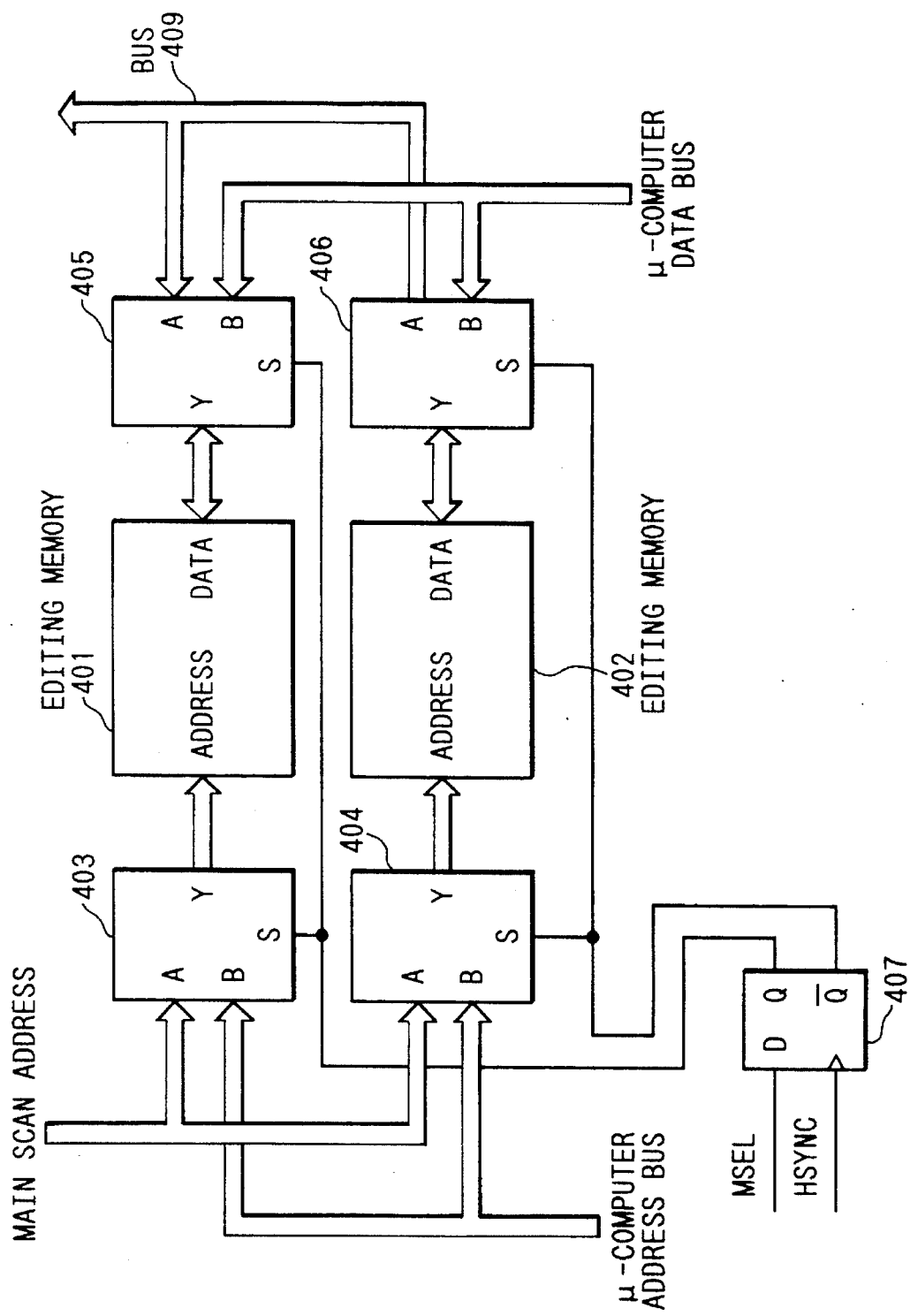
FIGS. 2 and 3 are block diagrams of an editing circuit.

On the other hand, bits 0 to 6 shown in FIG. 3 indicate signals which are sent from or are input to the selector 405 or 406 shown in FIG. 2 and relate to the image editing data.

The image editing data which was output from the editing memory 401 or 402 is transmitted through a setting/resetting circuit unit 412 and supplied to processing units 410, 411, 412, and 413.

In FIG. 3, only the setting/resetting circuit for bit 3 is shown. However, a similar construction is also used for the other bits. Assuming that an input to the circuit unit 414 is set to $IS_i$ and an output from the circuit unit 414 is set to $OS_i$, each time the input $IS_i$ is set to "1" by a gate 457 and a flip-flop 456, the output $OS_i$ is repetitively set to "1" and "0". On the contrary, when the input $IS_i$, namely, the data of the editing memory is set to "0", the output $OS_i$ holds the preceding state.

Therefore, when an attention is paid to a certain main scan line, it is sufficient to set "1" into the necessary bit of the editing memory address corresponding to a change point coordinates of the area. Such processing will now be described in detail hereinbelow.

AND circuits 450 and 451, an OR circuit 452, and an inverter 453 form one set. Eight sets are provided in the trimming block 410 in correspondence to the respective bits of the image data of eight bits. In FIG. 3, the other seven sets are omitted. When the output $OS_o$ of the setting/resetting circuit 414 is set to "1", the output of the image signal is permitted by a gate 451. When it is set to "0", the output of the image signal is inhibited. On the other hand, when the output $OS_o$ is set to "0", the information of the output $OS_1$ corresponding to bit 1 is output as image data through the gate 450. Therefore, with respect to the area in which the output of the image data was inhibited by the $OS_o$, by designating the value of $OS_1$, that is $IS_1$, the signal can be selected as a black or white output.

The circuit block 411 has eight OR gates 454 (seven OR gates among them are not shown) and can forcedly set the image data to black by the output $OS_3$.

The circuit block 412 has eight EX-OR gates 455 (seven EX-OR gates among them are not shown). When the $OS_2$ is set to the "H" level, the image data is reversed to become a negative image.

A gamma conversion ROM 413 is a table which receives the image data to addresses 0 to 7 and outputs a gamma conversion signal. In this case, one of four kinds of gamma (γ) conversion characteristics can be selected by the outputs $OS_4$ and $OS_5$.

The output $OS_6$ is sent as one of the image data to the buffer memory.

Figure 4:
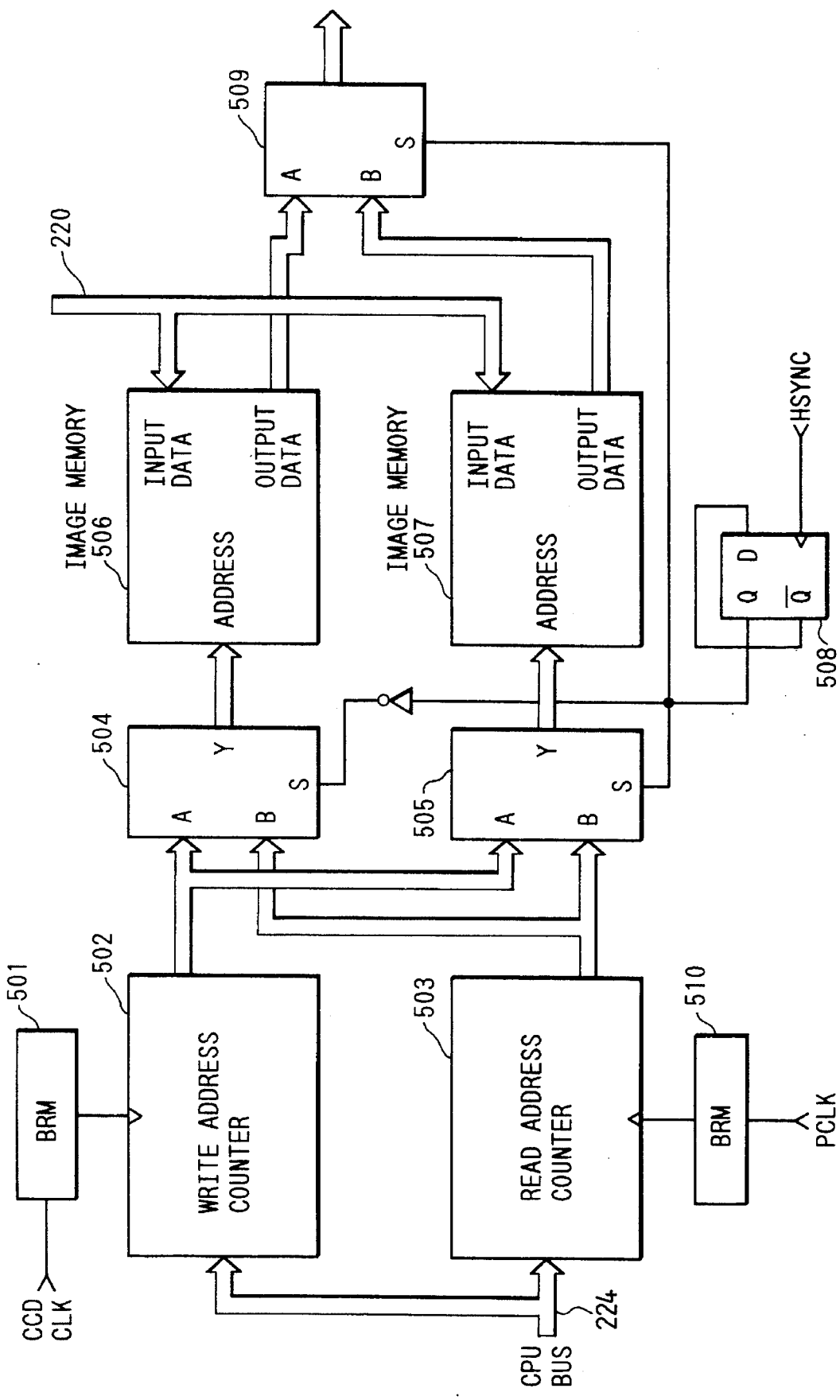
FIG. 4 is a block diagram of circuits around an editing memory.

FIG. 4 is a diagram showing the details of the buffer 105 and buffer control circuit 107 in FIG. 1.

The buffer 105 is used to execute the enlargement, reduction, and movement of an image and to convert the image data synchronized with a CCD read clock (each CCDCLK) into the image data synchronized with a printer sync clock (PCLK).

Image memories 506 and 507 have a double buffer memory construction. Each of the image memories 506 and 507 can store the image of one line. That is, each memory uses a memory having a construction of 8 kbits×9.

The case of writing data into the image memory 506 will now be described with an example.

First, when an address selector 504 selects A, the address of a write address counter 502 is input to the image memory 506 and image data 220 is written into the memory. At the same time, an address selector 505 of the memory 507 selects B, so that a read address counter 503 is selected. On the other hand, when a selector 509 selects B, an output of the memory 507 is selected and extracted as image data. At the next line, selection inputs of the selectors 502, 505, and 509 are switched by a horizontal sync signal (HSYNC), the reading and writing operations for the image memories 506 and 507 are switched and the operations opposite to those mentioned above are executed.

Further, in the writing mode, when the write address counter 502 is made operative by the clock signals which were obtained by thinning out the clock signals CCDCLK by a BRM (binary rate multiplier) 501, the data at the locations which were thinned out are skipped and the image data is stored into the image memories 506 and 507. Thus, the image data is reduced.

In a manner similar to the above, by thinning out the clock signals PCLK which are input to the read address counter 503 by the BRM 501, the image data 220 is overlapped at the locations corresponding to only those clock signals which were thinned out and is output from the image memories 506 and 507. Therefore, the image data is enlarged in accordance with a degree of thinning-out process.

In this case, although start addresses of the write address counter 502 and read address counter 503 can be freely set through a CPU bus 224 by the micro computer, when the same value is set, the image is not moved. If different addresses are set, the image can be moved in correspondence to the difference between them.

Further, a one-bit photograph area signal is added to the image data 220 as mentioned above. A total of nine bits comprising eight bits of the image and one bit of the control signal are sent. However, the control signal of one bit is also enlarged or reduced in a manner similar to the case of the image. Therefore, after completion of the variable magnifying process, the control signal and the image also correspond in a one-to-one relation. The image data and control signal which were variably magnified and edited are sent from the selector 509 to the recording unit 110.

In the recording unit 110, although not shown, the recording characteristics are changed in accordance with the control signal of a photograph character of each pixel, thereby forming an image adapted to each of the character/photograph.

In the above embodiment, although only one bit of the control signal has been enlarged or reduced together with the image signal, a number of control signals can be also enlarged or reduced together with the image signal. Thus, various signals corresponding to the image signal can be sent.

In the above embodiment, the editing memory has been provided in correspondence to one pixel of the CCD. However, it is also possible to set a plurality of pixels to one block and to have the editing memory in correspondence to the block.

A procedure to realize the edition of a non-rectangle area by using the editing memories 401 and 402 will now be described with reference to FIG. 5.

Figures 6, 7:
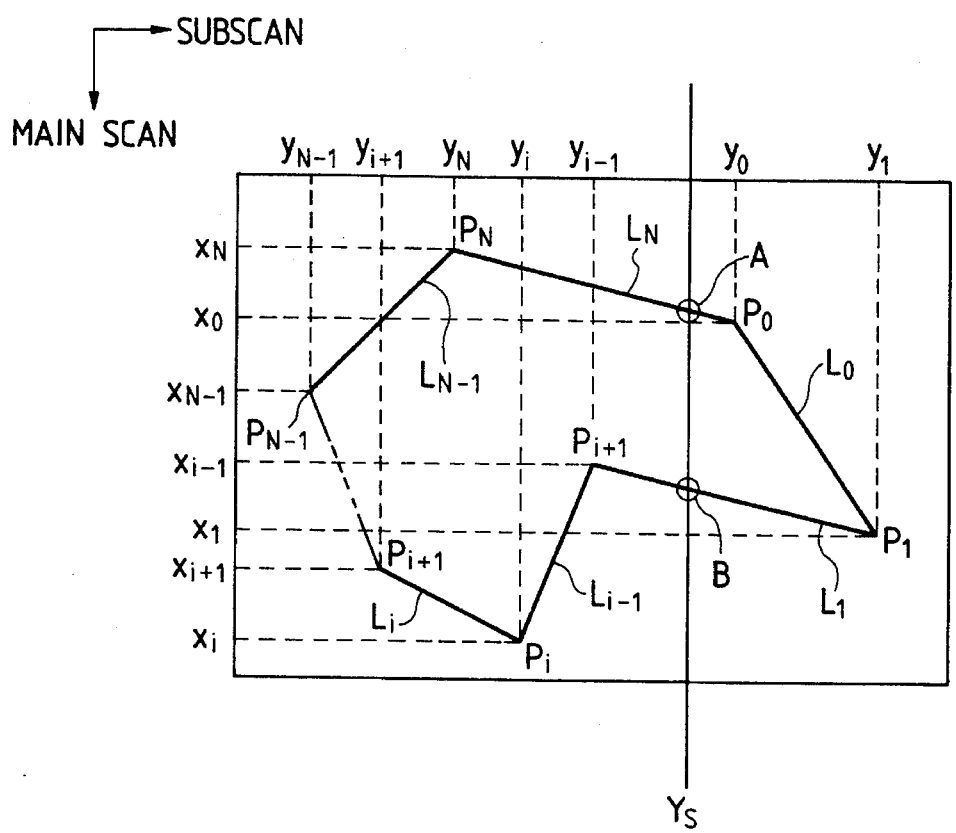
FIG. 6 is a diagrammatical view of an area.
FIGS. 7 and 8 are explanatory diagrams of a data table which is used in the editing processing.

Each time the operator inputs points $P_0, P_1, \ldots, P_N$ as shown in FIG. 6 by the digitizer 111, the coordinates $(x_o, y_o)$, $(x_1, y_1), \ldots, (x_N, y_N)$ of the respective points are registered into the area coordinate table in the RAM as shown in FIG. 7 in accordance with the input order (steps SP500 and SP501).

Figure 8:
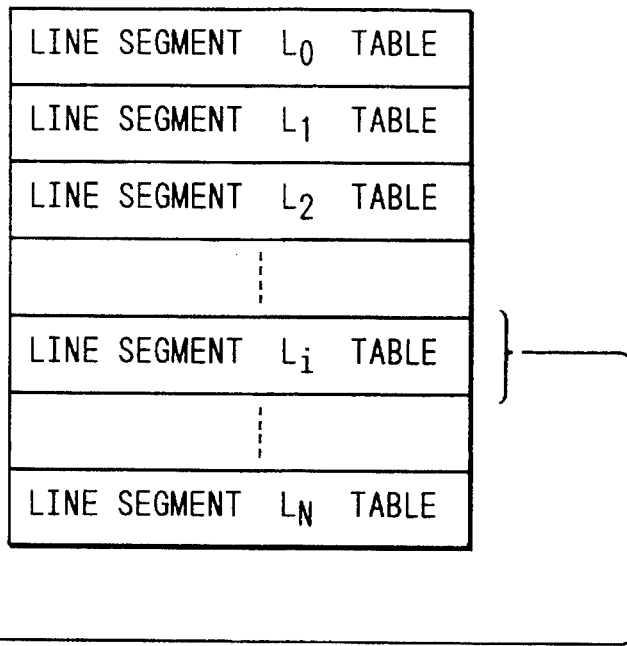

After all of the necessary points are completely input (SP502), a line segment table as shown in FIG. 8 is formed in an area in the RAM (SP503). The line segment table is formed in correspondence to each of the line segments which surround the area. For instance, with respect to an area as shown in FIG. 6, the line segment connecting points $P_o$ and $P_1$ is set to $L_o$, the line segment connecting points $P_1$ and $P_2$ is set to $L_1$, and the line segments are subsequently set to $L_2, \ldots, L_N$ in a manner similar to the above. Total (N+1) line segments are defined. The line segment table as shown in FIG. 8 is formed for each of the line segments. No line segment table is formed for the line segment which is in parallel with the main scan direction, that is, when $y_i = y_{i+1}$.

The content of the line segment $L_i$ table will now be described in detail with reference to FIG. 8.

The line segment $L_i$ is a line segment connecting points $P_i$ and $P_{i+1}$.

At this time, a line segment start subscan coordinate $Y_{Si}$ is set to min $(Y_i, Y_{i+1})$ and a line segment end subscan coordinate $Y_{Ei}$ is set to max $(y_i, Y_{i+1})$. On the other hand, a line segment start main scan coordinate $X_{Si}$ is set to $X_i$ when $Y_{Si}$ is set to $Y_i$. The $X_{Si}$ is set to $X_{i+1}$ when $Y_{Si}$ is set to $Y_{i+1}$. Between $X_i$ and $X_{i+1}$, one of them which is not equal to $X_{Si}$ is set to line segment end main scan coordinate $X_{Ei}$ for convenience of explanation.

A line segment slope integer part $K_i$ is defined as the quotient of $(X_{Ei} - X_{Si})/(Y_{Ei} - Y_{Si})$. A fraction part comprises $DX_i$ which satisfies $X_{Ei} - X_{Si} = K_i \times (Y_{Ei} - Y_{Si}) + D$ and $DY_i$, which is obtained by $DY_i = Y_{Ei} - Y_{Si}$. $EX_i$, $X_{Boi}$, and $X_{B1i}$ denote temporary buffers which are used during the actual copying operation.

Processing contents $T_i$ show editing processings to be executed in the area of FIG. 6. Practically speaking, $T_i$ coincides with the set contents of the editing memories 401 and 402. For instance, in the case of extracting only the image in the area, bit 0 is set to 1 and $T_i = 01_{HEX}$. Further, in the case of photograph processing the image, bit 6 is also set to 1 and $T_i = 41_{HEX}$.

Figure 5:
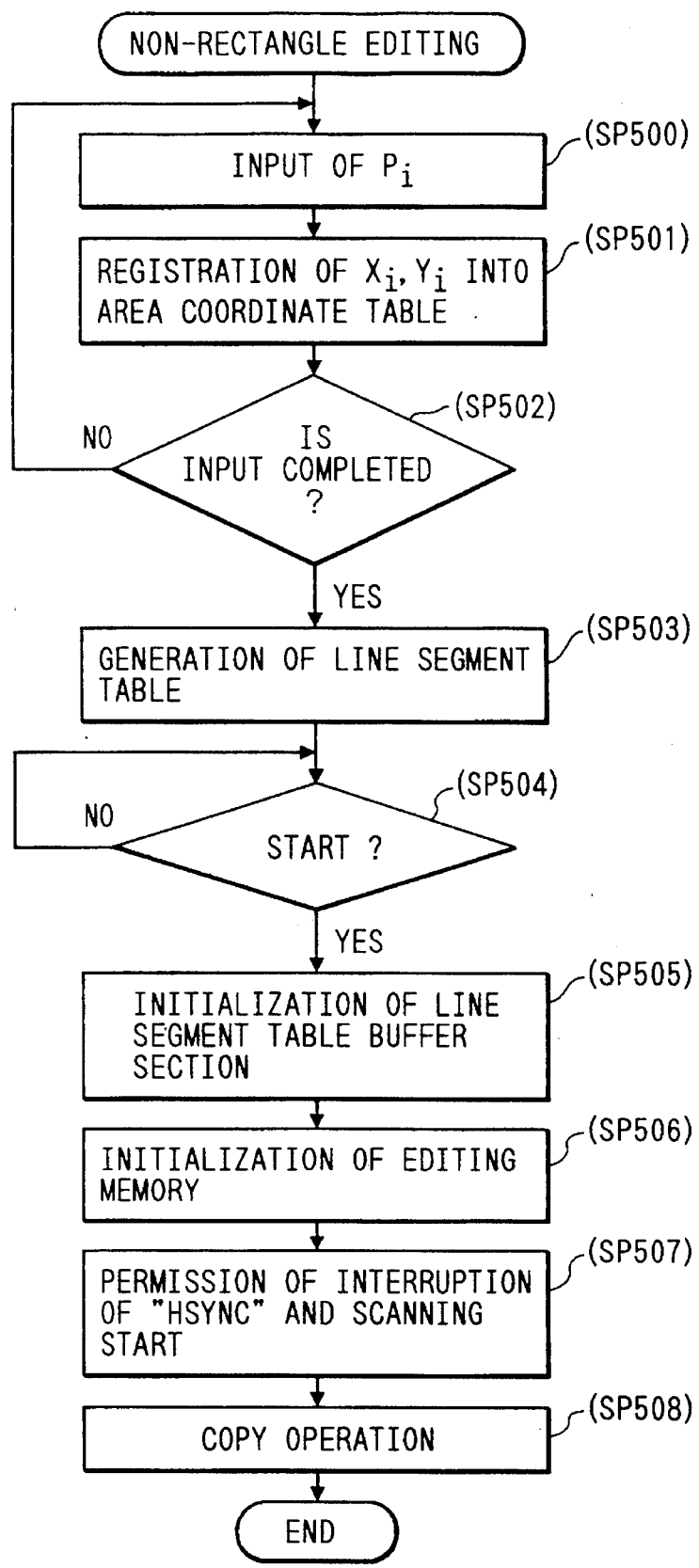
FIG. 5 is a flowchart for a whole editing processing.

After completion of the generation of the line segment table in step SP503 in FIG. 5, if the start of the copying operation was instructed by the operation unit 109 (SP504), three buffers in FIG. 8, that is, the slope arithmetic operation buffer $EX_i$ and both processing coordinate buffers $X_{Boi}$, and $X_{B1i}$ are initialized to 0 (SP505). On the other hand, both banks of the editing memories 401 and 202 are initialized to 0 (SP506). After the above preparation is finished, the interruption to the CPU by the horizontal sync signal HSYNC is permitted and the scan started (SP507). Thereafter, the copying operation is performed (SP508).

Figure 9B:
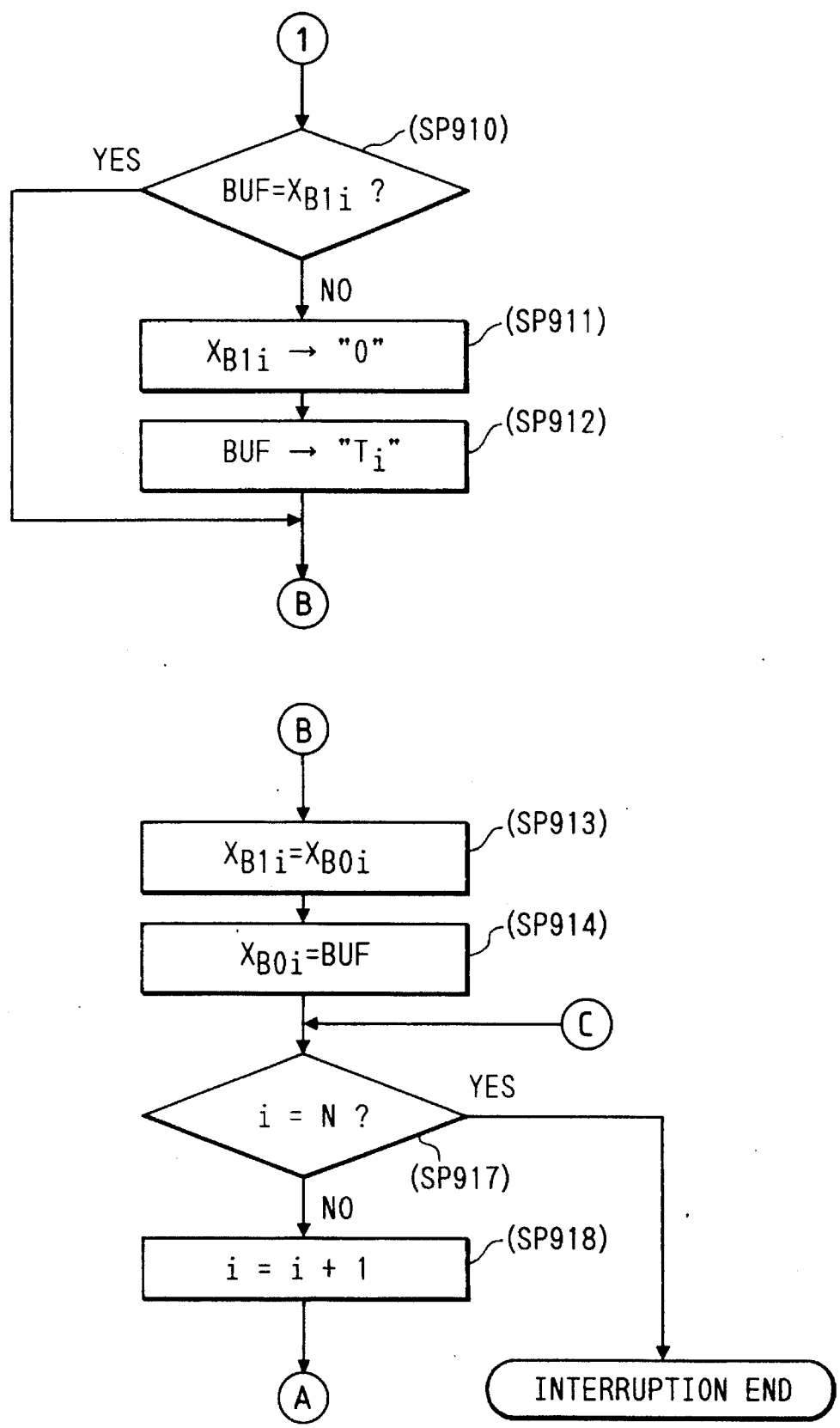
FIG. 9 consisting of FIGS. 9a and 9b is a detailed flowchart for the editing processing.

FIG. 9 shows a control procedure for the editing memories 401 and 402 for the copying operation time interval and will be explained hereinbelow.

The accessing operations to the editing memories 401 and 402 are executed synchronously with the HSYNC interruption. In the embodiment, the control is executed by the interruption every line. However, it is also possible to control on a unit basis a predetermined plurality of lines in accordance with a desired editing accuracy. First, the banks of the editing memories are switched (SP900). The editing memory on the side which has already been prepared by the interruption of the preceding line is used for the CCD image editing. The editing data to be used at the next line is written into the editing memory on the side which was already used for editing at the preceding line in accordance with the following steps.

That is, a subscan counter CNT in the RAM indicative of the subscan position of the optical system is increased by "1" (SP901). Further, an area i in the RAM indicative of the line segment number is initialized to "0" (SP902). The value of "i" changes from 0 to N by the single HSYNC interruption and the following processings are repeated only by the number of line segments.

First, the relation between the subscan position (line segment start subscan coordinate $Y_{Si}$) of the line segment $L_i$ and the present subscan position (subscan counter CNT) is examined. If $Y_{Si}$>CNT, this means that the line segment does not yet reach the line segment $L_i$, so that no processing is executed and the processing routine advances to ⓒ (SP903). On the other hand, with respect to the joint portion of two line segments, in the embodiment, since it is processed at the terminating end of the line segment, which is preceding with regard to the subscan direction, even when $Y_{Si}$=CNT, the processing routine advances to ⓒ (SP903).

If $Y_{Si}$<CNT, the line segment end subscan coordinate $Y_{Ei}$ of the line segment $L_i$ and the count value of the subscan counter CNT are then compared (SP904). If $Y_{Ei}$≧CNT, that is, if the present subscan position is located in the line segment $L_i$ (SP905), the following processings are performed.

(SP905) to (SP909) relate to the processings to discretely arithmetically operate and form a line segment having an arbitrary slope.

Since the slope of the line segment has been defined by the integer part $K_i$ and the fraction part $DX_i/DY_i$ as mentioned above, each time the subscan coordinate advances by "1", the main scan coordinate is advanced by at least $K_i$ (SP907, SP909). With respect to the fraction part, each time the subscan coordinate advances by "1", a numerator $DX_i$ is added to the temporary buffer $EX_i$ (SP906). When the total value exceeds a denominator $DY_i$ (SP905), the main scan coordinate is advanced by "1" (SP909). At this time, $DY_i$ is subtracted from the temporary buffer $EX_i$ (SP908). Further, the temporary buffer $EX_i$ is previously initialized to "0" before the start of the subscan.

When a main scan coordinate BUF obtained as mentioned above differs from the main scan coordinate $X_{B1i}$, which had been processed at the two-preceding line, the editing processing contents $T_i$ are set into the address BUF in the editing memory (SP912). On the other hand, "0" is set into the address $X_{B1i}$ in order to reset the editing contents which were processed by using the same bank of the editing memory at the two-preceding line (SP911).

On the other hand, when the coordinate BUF to be processed is equal to the coordinate $X_{B1i}$, which had been processed at the two-preceding line, the processes in steps SP911 and SP912 are skipped (SP910).

After that, the coordinate buffers $X_{B1i}$ and $X_{Boi}$, which were processed for the line segment $L_i$ with respect to each of the two editing memories 401 and 402, are updated (SP913, SP914). On the other hand, in SP904, if the count value of the counter CNT, which is indicative of the subscan coordinate is larger than $Y_{Ei}$, which is indicative of the rear edge coordinate of the line segment $L_i$, the rear edge processing of the line segment $L_i$ is performed with respect to two lines of $Y_{Ei}$+1 and $Y_{Ei}$+2. That is, the editing memory address $X_{B1i}$ which was processed at the two-preceding line is reset to "0" (SP915, SP916). Since two banks are provided for the editing memories, the processings are executed with regard to two lines.

After the above processings are executed with respect to all of the line segments $L_o$ to $L_N$ while updating "i" (SP917, SP918), the interruption processing is finished.

FIG. 10 diagrammatically shows a state of the above processings.

The line segment $L_i$ denotes a line segment with a slope ½ from ($x_i$, $y_i$) to ($x_{i+1}$, $y_{i+1}$).

It will be understood that each time the subscan address advances by "1", the two editing memory banks 0 and 1 (editing memories 401 and 402) are alternately applied. When attention is paid to a certain subscan address, "0" is always written into the main scan address which was processed at the two-preceding line and the processing contents $T_i$ are written into the new main scan address.

It will be appreciated that the subscan addresses $y_{i+1}$+1 and $y_{i+1}$+2 correspond to the finishing processings which have been described in FIG. 9 (SP916) and that "0" is written in the processing addresses at the two-preceding line.

By dividing the area into the line segments forming the area and by substantially independently controlling each of the line segments, a non-rectangle as shown in FIG. 6 can be easily processed.

Further, it is a feature of the method of the invention that there is no need to keep track of which one of the start and end points of the area line segment corresponds to the main scan direction. For instance, when the focus is on to the subscan coordinate $Y_S$ in FIG. 6, point A is a start point of the area and point B is an end point of the area. However, since the same processing contents are written into the addresses corresponding to the points A and B in the editing memory, the processing is started at point A by the flip-flop 456 in FIG. 3 in the editing circuit and contrarily finished at point B.

Further, the method of the invention has a feature such that it is possible to easily process even in the case where a plurality of areas overlapped.

Figure 11A:
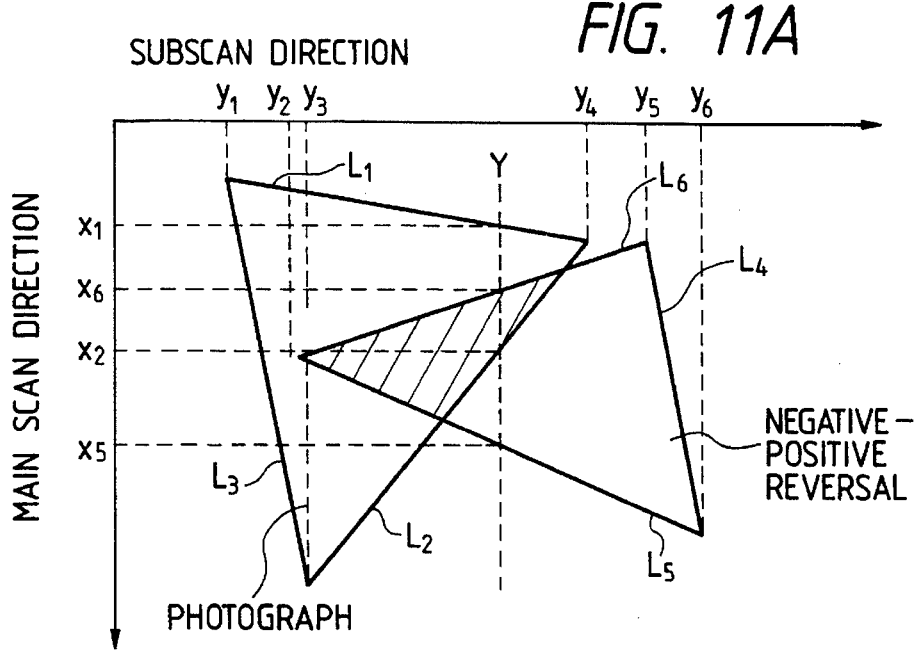
FIGS. 11A to 11C are explanatory diagrams of the editing of a plurality of areas.
Figures 11B, 11C:
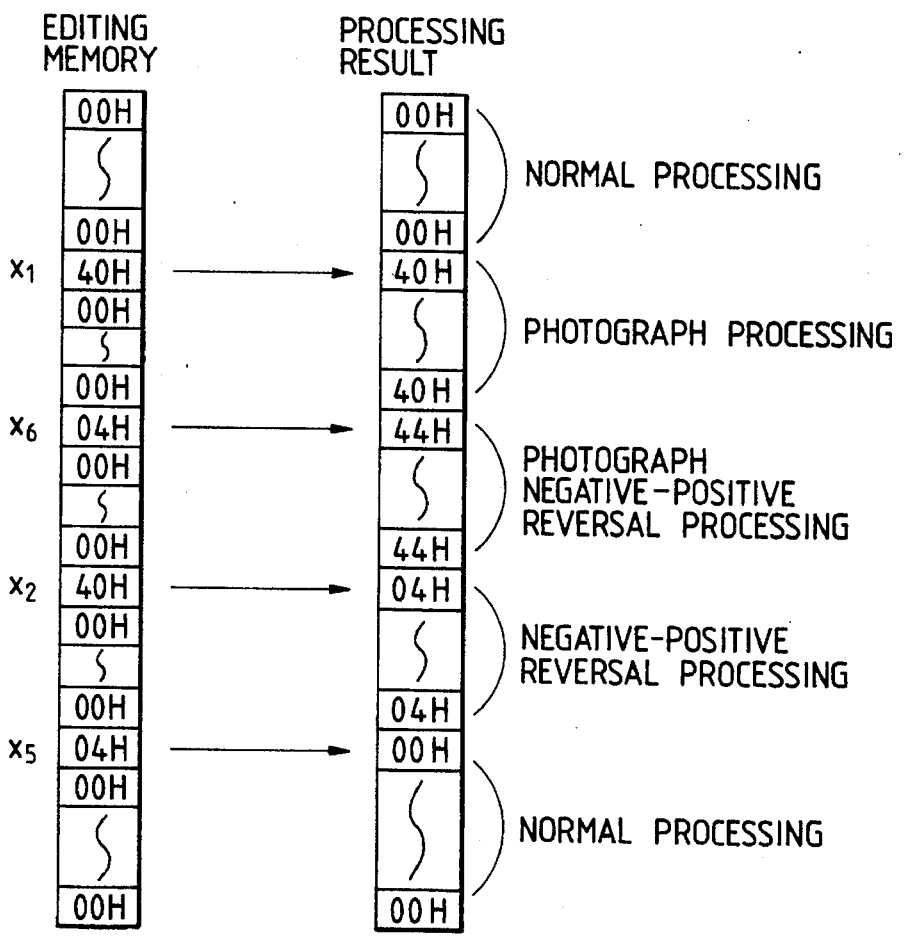

Such an example is shown in FIGS. 11A to 11C.

FIG. 11A shows the case where two triangle areas partially overlap. One of the triangle areas requires a photograph processing and the other requires a negative-positive reversal processing. In such a case, according to the present method, both of the above processings are easily performed to the hatched portion in the diagram corresponding to the overlapped region. For instance, to process the contents of the editing memories at a certain subscan position Y, as shown in FIG. 11B, a photograph processing code 40H is written into addresses $x_1$ and $x_2$ as a photograph area and a negative/positive reversal processing code 04H is written into addresses $x_6$ and $x_5$ as a negative-positive reversal area. Thus, as shown in FIG. 11C, the processings depicting the processing results can be performed.

[Another embodiment]

A processing method in which a high processing speed is realized will now be described as a second embodiment. In the above method, the processings have been executed every HSYNC interruption with respect to all of the line segments. However, for instance, in the case of FIG. 6, all of the line segments $L_{N-1}$, $L_N$, and $L_o$ do not always contribute to the editing at a certain subscan position but at most only one of them is always practical.

Therefore, by handling $L_{N-1}$, $L_N$, and $L_o$ as one group, the interruption processing speed is increased and a higher number of areas can be processed.

Figure 12:
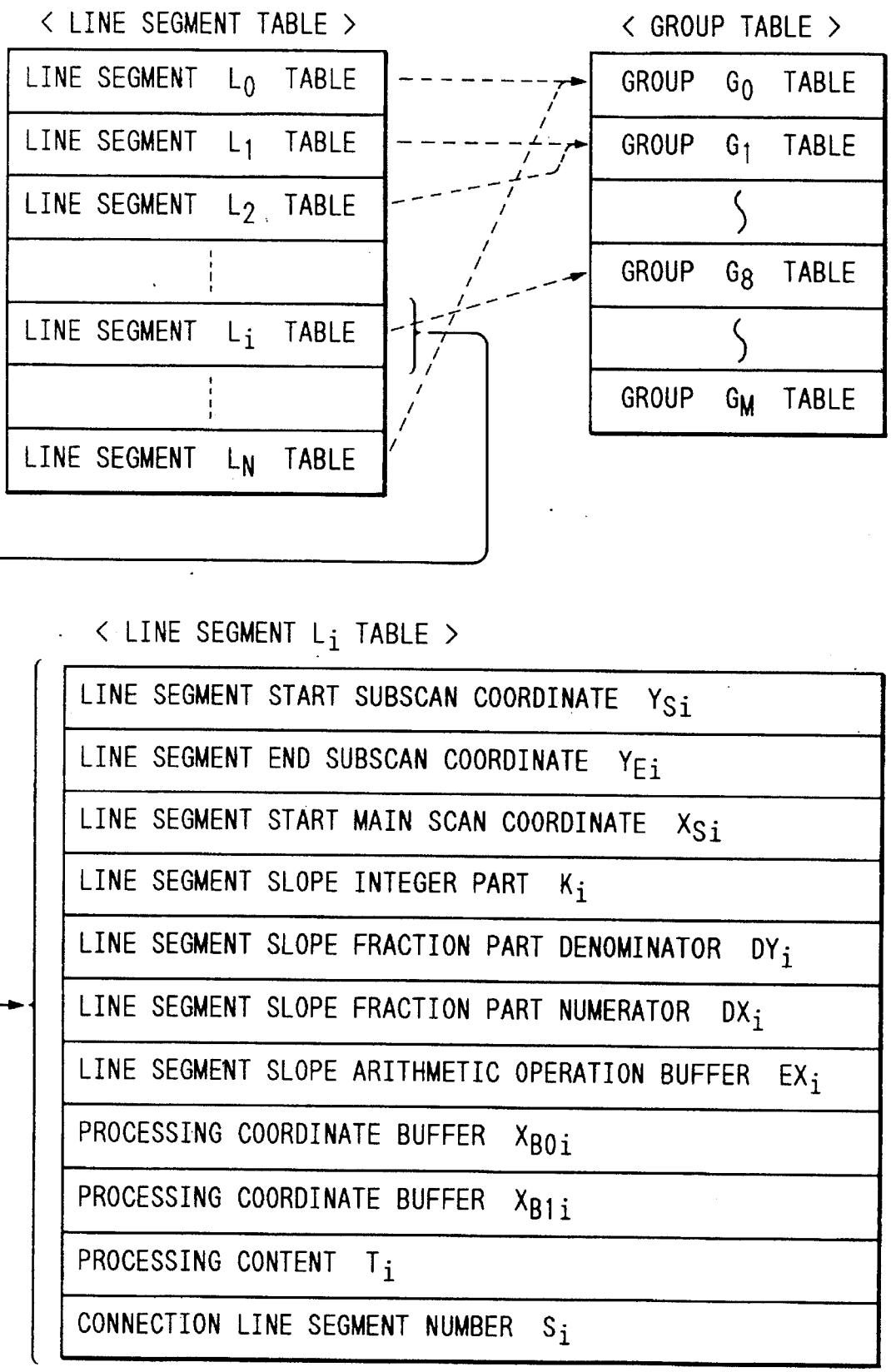
FIG. 12 is an explanatory diagram of data tables which are used in the editing processing.

In the second embodiment, the line segment tables are constructed as shown in FIG. 12. An area $S_i$ in the RAM to store the number of line segments connected after the line segment $L_i$ is added at the end of the line segment $L_i$ table in FIG. 8.

For instance, in the example of FIG. 6, $S_{N-1}$=N and $S_N$=0. On the other hand, in the case of a line segment which has no line segment to be connected therewith, like a line segment $L_o$, the line segment number which cannot practically exist is set such that $S_o$=FF$_{HEX}$ or the like.

In the second embodiment, on the other hand, a group table in FIG. 12 is accessed instead of directly accessing the line segment table at every interruption of processing.

Each of the group tables has substantially the same format as that of each of the line segment tables. One table among the line segments constructing the group is always loaded.

An example of FIG. 11 will now be considered. Each of the line segments $L_1$ and $L_5$ forms one group, two line segments L3 and L2 form one group, two line segments $L_6$ and $L_4$ form one group, and a total of four groups are formed.

Assuming that a group $G_0$ relates to $L_1$, a group $G_1$ relates to $L_3$ and $L_2$, a group $G_2$ relates to $L_6$ and $L_4$, and a group $G_3$ relates to $L_5$, the group $G_1$ table is a table of the line segment $L_3$ until the subscan coordinate $y_3$ and is a table of the line segment $L_2$ after $Y_3$. Since "2" has been set as a connected line segment number $S_3$ into the line segment $L_3$ table, the contents of the group $G_1$ table can be switched to the contents of the line segment $L_2$ table at the subscan coordinate $y_3$.

With the above method, although the processings with respect to six line segments are always necessary in the case of FIG. 11 in the first embodiment, it is sufficient to execute the processings with respect to four line segments in the second embodiment.

A processing method in the case where a part of the line segments constructing an area is not a straight line will now be described as a third embodiment.

Figure 13:
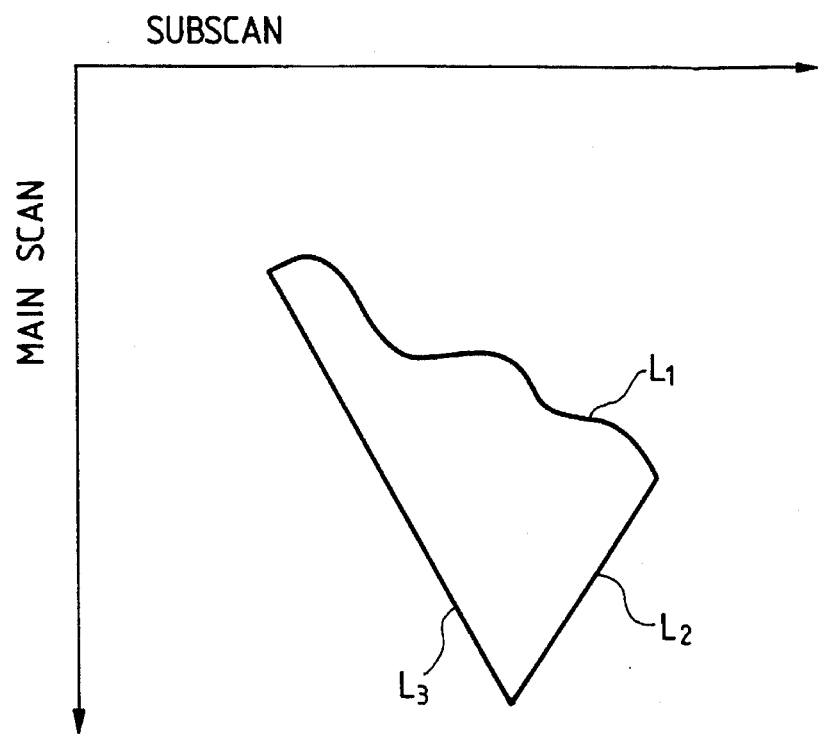
FIG. 13 is a diagram showing an example of an area.
Figure 14:
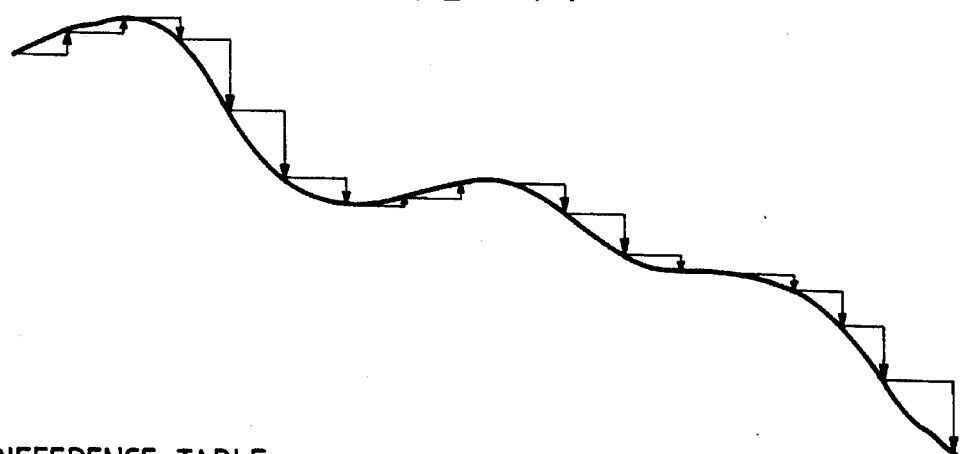
FIG. 14 is a diagram showing an example of a difference table showing curves.

Even for an area of a shape as shown in FIG. 13, the idea such that the area is divided into line segments and processed is very effective. In this case, the line segment $L_1$ is prepared as a difference table as shown in FIG. 14.

On the other hand, as shown in FIG. 15, in the line segment table, a line segment type $P_i$ is further added to the elements of FIG. 8, and when $P_i$ is set to 0, $P_i$ is regarded as a straight line and the control is executed as in the first embodiment, and when $P_i$ is set to 1, $P_i$ is not a straight line, so that a head address Ai of the difference table is set in place of the line segment slope data. On the other hand, a buffer $B_i$ to update the access address of the difference table is prepared.

A processing procedure in the HSYNC interruption is shown in FIG. 16. The processings in steps SP900 to SP904 are the same as those in FIG. 9. When the subscan coordinate position enters a control range of the line segment $L_i$, the line segment type $P_i$ is examined (SP1601). If it is a straight line, the processing routine advances to step SP905 and the processings are executed hereinbelow in the same manner as in the first embodiment. When $P_i=1$, the content of address $A_i+B_i$ of the difference table is set into the area $d_i$ in the RAM (SP1602). Access address $B_i$ is updated by "1" for the next interruption (SP1603). The difference $d_i$ is added to the preceding processing coordinate $X_{Boi}$, thereby setting to the present processing coordinate BUF (SP1604). After that, the same processing as SP910 in FIG. 9 is executed. As mentioned above, in the third embodiment, the editing processing can also be easily performed to an area comprising straight lines and a curve as shown in FIG. 13.

As described above, after the area was divided into line segments constructing the area and the attribute of the area was given to each of the line segments, by independently processing all of the line segments, complicated editing processings of a plurality of non-rectangle areas can be performed by a very simple program without needing a large capacity memory.

Although the present invention has been described above with respect to the preferred embodiments, the invention is not limited to the foregoing embodiments but many modifications and variations are possible within the spirit and scope of the appended claims of the invention.

What is claimed is:

1. An image processing apparatus comprising:

designating means for designating a plurality of non-continuous points for specifying a desired area of an original document, each of the plurality of non-continuous points indicating a corner of the desired area, the desired area being a polygon of which at least one side is parallel to neither a main scan direction nor a sub-scan direction;

dividing means for dividing an outline of the desired area defined by connecting the plurality of non-continuous points designated by said designating means into a plurality of line segments, two adjacent line segments being capable of making an arbitrary angle;

memory means for storing line segment data indicative of a position and a slope of each of said line segments;

area data generating means for calculating, in units of one or more main scan lines, area data indicative of the desired area defined by connecting the plurality of non-continuous points on the basis of the line segment data read out from said memory means; and processing means for performing mutually different processing for an image within the desired area of the original document and an image outside the desired area in accordance with the data calculated by said area data generating means.

2. An apparatus according to claim 1, wherein said memory means stores the line segment data indicative of a start point, an end point, and a slope of each of the plurality of line segments.

3. An apparatus according to claim 1, wherein said forming means forms the area data corresponding to the image position to be processed by said processing means.

4. An apparatus according to claim 1, further comprising holding means for holding the area data calculated by said area data generating means for an amount corresponding to a plurality of lines.

5. An apparatus according to claim 1, further comprising scanning means for scanning an image of the original image document, wherein said processing means processes the image of the original document scanned by the scanning means.

6. An apparatus according to claim 1, wherein said designating means includes a digitizer.

7. An image processing apparatus comprising:

scanning means for scanning an image of an original document;

dividing means for dividing an outline of a partial area specified by connecting a plurality of non-continuous points in the original document into a plurality of line segments, each of the plurality of non-continuous points indicating a corner of the partial area, the partial area being a polygon of which at least one side is parallel to neither a main scan direction nor a sub-scan direction, two adjacent line segments being capable of making an arbitrary angle;

memory means for storing line segment data indicative of a position and a slope of each of said plurality of line segments;

area data generating means for calculating, in unit of one or more main scan lines, area data indicative of the partial area defined by connecting the plurality of non-continuous points on the basis of the line segment data read out from said memory means in synchronism with the scanning of the image of the original document; and processing means for performing mutually different processing for an image within the partial area of the original document scanned by said scanning means and an image outside the partial area in accordance with the data calculated by said area data generating means.

8. An apparatus according to claim 7, wherein said memory means stores line segment data indicative of a start point, an end point, and a slope of each of the plurality of line segments.

9. An apparatus according to claim 7, wherein said area data generating means calculates the area data corresponding to the image position to be processed by said processing means.

10. An apparatus according to claim 7, further comprising holding means for holding the area data calculated by said area data generating means by an amount corresponding to a plurality of lines.

11. An apparatus according to claim 7, further comprising designating means for designating the partial area by specifying a plurality of points.

12. An apparatus according to claim 11, wherein said designating means includes a digitizer.

13. An apparatus according to claim 7, wherein said scanning means scans the image of the original document line by line, and wherein said area data generating means forms the area data in synchronism with the scanning of the image of the original document on a line basis by said scanning means.

14. An apparatus according to claim 5, wherein said area data generating means calculates the area data in synchronism with the scanning of the image of the original document by said scanning means.

15. An image processing method comprising the steps of:

dividing an outline of a partial area specified by connecting a plurality of non-continuous points in an original document into a plurality of line segments, each of the plurality of non-continuous points indicating a corner of the partial area, the partial area being a polygon of which at least one side is parallel to neither a main scan direction nor a sub-scan direction, and two adjacent line segments being capable of making an arbitrary angle;

storing line segment data indicative of a position and a slope of each of said plurality of line segments;

calculating, in units of one or more main scan lines, area data indicative of the partial area defined by connecting the plurality of non-continuous points on the basis of the line segment data; and performing mutually different processing for an image within the partial area of the original document and an image outside the partial area in accordance with the area data formed.

16. A method according to claim 15, further comprising the step of scanning an image of the original document, wherein in said calculating step the area data is calculated in synchronism with the scanning of the image of the original document.

17. A method according to claim 15 further comprising the step of designating a plurality of points for specifying the desired partial area.

\* \* \* \* \*

UNITED STATES PATENT AND TRADEMARK OFFICE
CERTIFICATE OF CORRECTION

PATENT NO. : 5,583,955
DATED : December 10, 1995
INVENTOR(S) : Masanori YAMADA

It is certified that error appears in the above-indentified patent and that said Letters Patent is hereby corrected as shown below:

ON THE COVER:

"ABSTRACT", item [57]:

Line 11, "on the basis of" should read --based on--.

COLUMN 1:

Line 22, "U.S. Pat. No. 2,556,915" should read --U.S. Pat. No. 4,556,915--;
Line 23, "U.S. Pat. No. 2,835,618" should read --U.S. Pat. No. 4,835,618--; and
Line 41, "which" should read --which,--.

COLUMN 6:

Line 12, "$X_{i+1}$ when $Y_{si}$" should read --$X_{i+1}$ when $Y_{si}$--; and
Line 19, "$DX_i$" should read --$DX_i$,--.

UNITED STATES PATENT AND TRADEMARK OFFICE
CERTIFICATE OF CORRECTION

PATENT NO. : 5,583,955
DATED : December 10, 1995
INVENTOR(S) : Masanori YAMADA

It is certified that error appears in the above-indentified patent and that said Letters Patent is hereby corrected as shown below:

COLUMN 9:

Line 6, "L3 and L2" should read --$L_3$ and $L_2$--.

COLUMN 10:

Line 61, "unit" should read --units--.

Signed and Sealed this

Twenty-second Day of April, 1997

Attest:

BRUCE LEHMAN

*Commissioner of Patents and Trademarks*

*Attesting Officer*